Dec. 23, 1958 J. P. MILLER 2,865,307
RAILWAY VEHICLE TRUCK
Filed Oct. 8, 1954 3 Sheets-Sheet 1
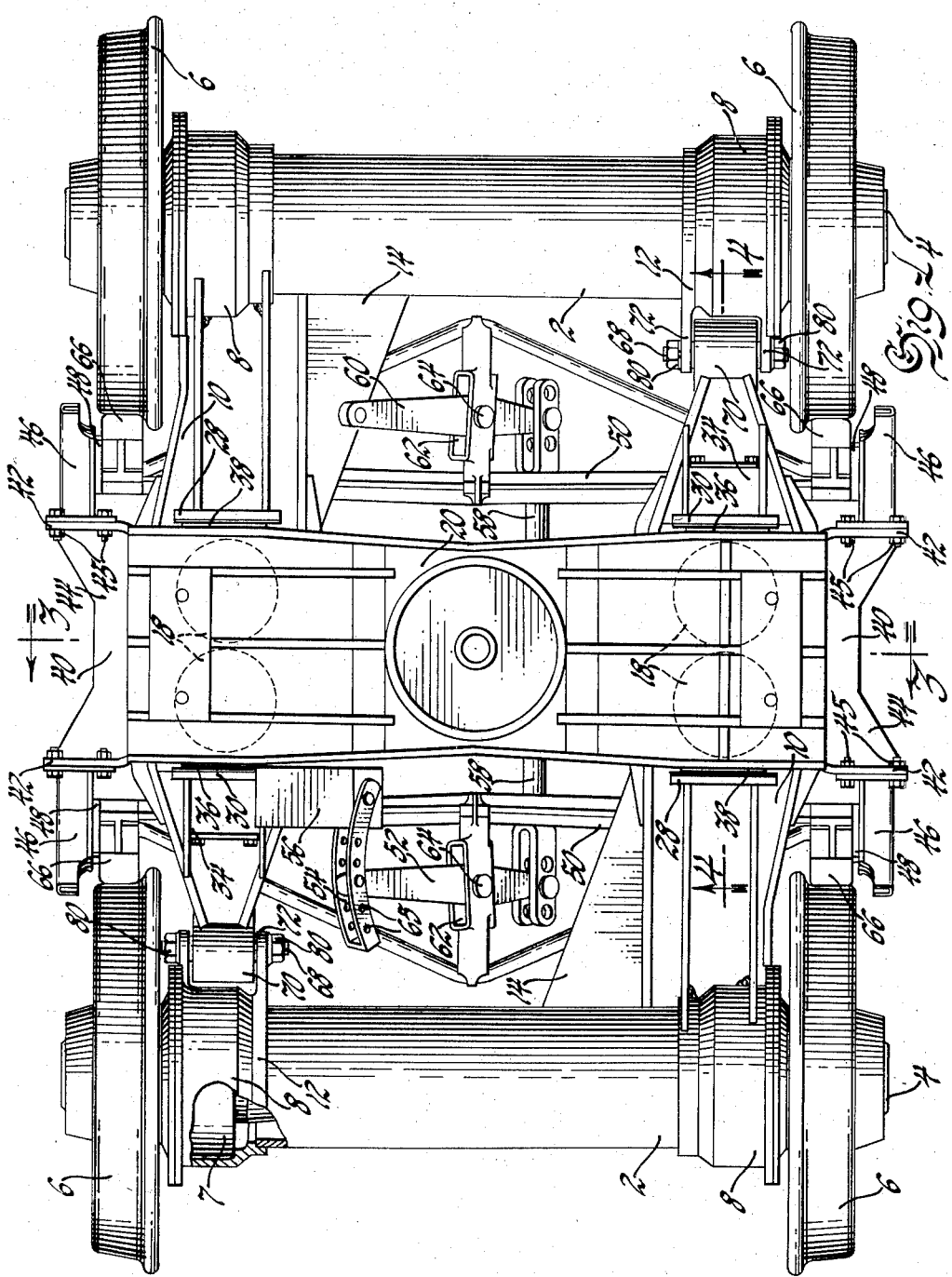
INVENTOR
Joseph P. Miller
BY
S.C. Thorpe
ATTORNEY Dec. 23, 1958   J. P. MILLER   2,865,307
RAILWAY VEHICLE TRUCK
Filed Oct. 8, 1954   3 Sheets-Sheet 2
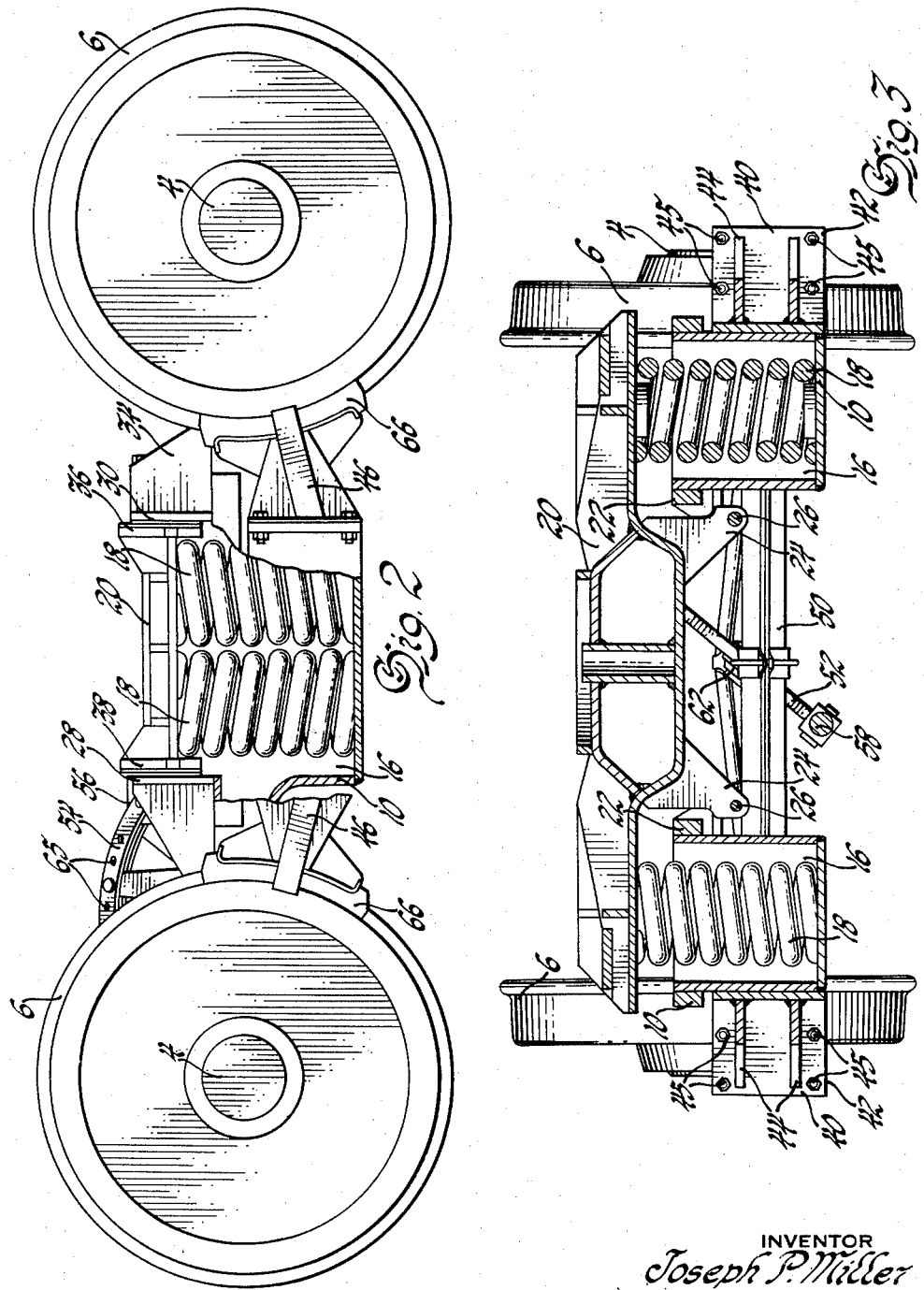
INVENTOR
Joseph P. Miller
BY
J. C. Thorpe
ATTORNEY Dec. 23, 1958  J. P. MILLER  2,865,307
RAILWAY VEHICLE TRUCK
Filed Oct. 8, 1954  3 Sheets-Sheet 3

INVENTOR
Joseph P. Miller
BY
J. C. Thorpe
ATTORNEY

United States Patent Office 2,865,307
Patented Dec. 23, 1958

2,865,307

RAILWAY VEHICLE TRUCK

Joseph P. Miller, Hinsdale, Ill., assignor to General Motors Corporation, Detroit, Mich., a corporation of Delaware Application October 8, 1954, Serial No. 461,168

7 Claims. (Cl. 105—197)

This invention relates to railway vehicle trucks and more particularly to high speed trucks adaptable to either passenger or freight service.

There has long been a demand for a railway vehicle truck which is capable of supporting the extremely heavy loads often encountered in freight service and yet may travel at the relatively high speeds to which passenger car trucks are normally subjected. Such a truck must be extremely rugged, capable of riding well under light or heavy loads and require the minimum of maintenance.

It is therefore the primary object of this invention to provide a truck which meets the above requirements.

It is a more specific object of this invention to provide a versatile high speed railway vehicle truck which has the side frames articulated in a way to improve the ride thereof, the truck construction being uniquely simplified to substantially lower the height of the frame thereof, increase the compactness and enable a simplified brake assembly to be used which is expeditiously assembled and disassembled from the truck.

It is a further object of the invention to provide a truck having a unique means for anchoring the bolster to the side frames, the truck further having positive connections between elements at all points at all times so that upon derailment or lifting the truck will remain assembled.

For related and other objects of this invention reference may be had to the accompanying description and drawings, in which:

Fig. 1 is a plan view of the entire truck including the new brake rigging therefor and the manner of supporting the brake rigging from the side frame members. Fig. 1 also shows the unique articulated joints between the ends of the side frames and projections on each of the axle members.

Fig. 2 is a side view in elevation of the truck with portions broken away to indicate how the bolster is resiliently supported by the side frame members. Fig. 2 also illustrates the unique guide means for guiding the outer ends of the brake beams of the truck brake rigging.

Fig. 3 is a sectional view in elevation taken substantially on the line 3—3 of Fig. 1 and illustrates how the bolster is tied down to the side frame members and also how the bolster is resiliently supported by the side frame members. Fig. 3 also indicates how the frame of the truck has been compactly constructed and its height lowered.

Figure 5:
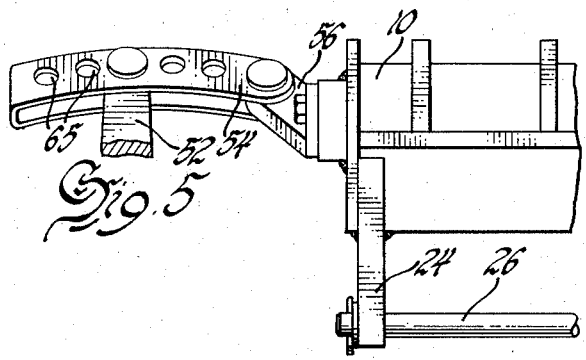

Fig. 5 serves to illustrate certain details of one of the side frames and how lugs are appended thereto to support the upper end of one of the dead brake levers and to support one of the pins anchoring the bolster to a side frame.

Figure 6:
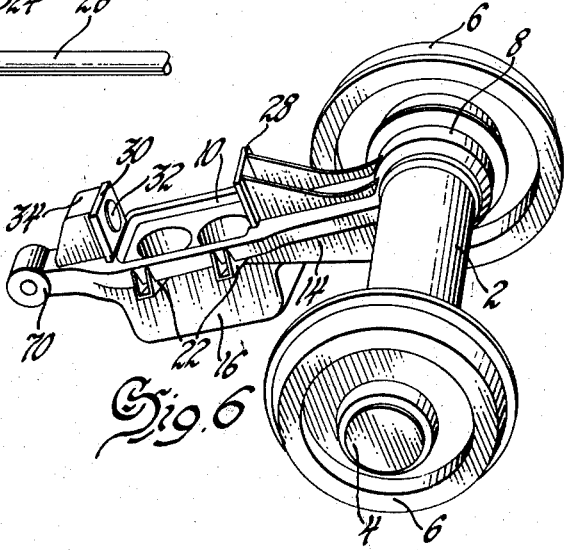

Fig. 6 is a view in perspective of one of the assemblies, which includes a side frame member and an axle member rigidly connected together.

Figure 7:
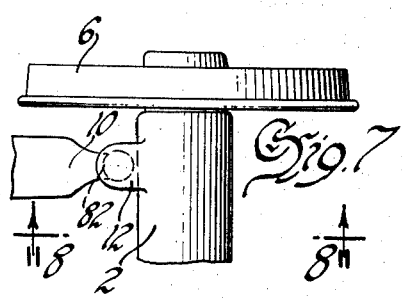

Fig. 7 shows a modification of one of the articulated joints which comprises a ball and socket joint.

Figure 8:
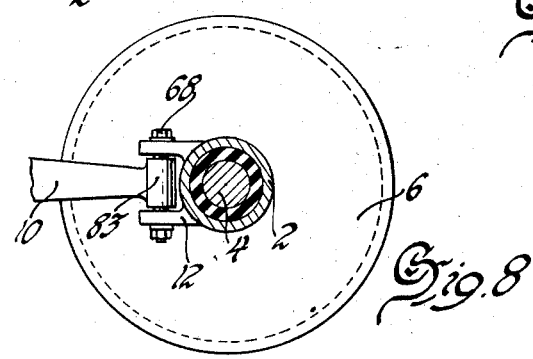

Fig. 8 is a second modification showing the joints being pinned by means of vertically disposed pins extending through vertical bosses on the ends of the side frame members.

Referring now to Figs. 1 through 6 it will be observed that the truck comprises a pair of longitudinally spaced, transversely extending axle housing members 2 each of which houses an axle 4 to which are attached the usual wheels 6. The axles 4 are journaled for rotation in the members 2 by means of built-in roller type bearings 7 completely enclosed in the enlarged portions 8 of the axle members or housings 2.

The use of bearings such as those indicated by 7 enables the truck to travel at high speeds without the attendant difficulties such as hot boxes, etc., found with other types of bearings and journals normally used in freight service. Also by completely enclosing bearings 7 in enlarged portions 8 of axle housing 2 the bearings are fully protected from foreign matter, etc., which would otherwise contaminate them and reduce their service life. It should be observed that the bearings are located inside or inboard of the wheels rather than outboard as is usually the case. This serves as further protection to the bearings 7 and eliminates the usual outwardly extending journal boxes and the outboard downwardly extending pedestals which are so often snagged and damaged, not to mention the damage caused thereby.

Rigidly connected to each housing 2 inside or inboard of an adjacent wheel 6 is on one end a side frame member 10 and on the other end a projection 12. As may be observed from Figs. 1 and 6, the side frame members 10 are each secured to and associated with an axle member 2 in such a way that the side frame 10 and the associated member 2 may be considered a unit assembly. In order to reinforce the rigid connection between the side frame and axle housing members 10 and 2, large gusset plates 14 have been provided.

The side frames 10 extend in opposite directions relative to each other and toward the projections 12 to which they are attached by means of articulated joints to be described in more detail later. Each of the side frames 10 is provided with a spring pocket 16 for the reception of helical coil bolster springs 18 which resiliently support a bolster 20 on the side frames 10 for lateral swinging movement with respect thereto. Located inboard of each side frame member 10 adjacent the pockets 16 are stops 22 having downwardly facing surfaces. Secured to the underside of the bolster 20 are transversely disposed, longitudinally spaced lugs 24 having holes in the lower ends thereof through which extend pins 26. Upon extended upward movement of the bolster 20 relative to the side frame members 10 the pins 26, when in place in the lugs 24, will engage the downwardly facing surfaces on the stops 22 so as to prevent further upward or vertical movement of the bolster 20 relative to side frames 10. With the pin and lug construction just described it will be appreciated that to remove the bolster 20 it is merely necessary to first remove the pins 26 after which it is a simple matter to lift the bolster 20 away from the remaining part of the truck. Also, with this construction there are actually no parts between bolster and frame aside from the springs 18 which actually contact both bolster and frame. This enables the bolster to move both laterally and vertically limited amounts relative to the side frames 10 thereby achieving the lateral swinging motion of the bolster considered important for obtaining a superior ride.

In order to transmit longitudinal movement between the bolster and side frames 10 longitudinally center-facing chafing plates 28 and 30 have been provided on the side frames 10. It will be observed that the chafing plates 30 are diagonally located with respect to the center of the truck and as seen in Fig. 6 are equipped with spring-loaded plungers 32 enclosed in housings 34. By diagonally locating the plungers 32 so that they engage longitudinal end-facing chafing plates 36 on bolster 20 a moment is applied to bolster 20 tending to turn it relative to the side frames 10. This turning moment causes engagement between a second diagonally located set of longitudinal end-facing chafing plates 38 on the bolster 20 and the chafing plates 28. Engagement between the plungers 32 and chafing plates 36 and chafing plates 38 and 28 takes up any longitudinal clearance between bolster and frame and effectively damps the aforementioned vertical and lateral swinging movement of the bolster 20 relative to the side frames 10.

Particularly in Fig. 1 it may be seen that each of the side frames 10 is provided with a laterally extending projection 40 which extends between two of the wheels 6 on one side of the truck and beyond the outer vertical faces of these wheels. These projections include longitudinally spaced vertical plates 42 reinforced by longitudinally extending flange plates 44. Secured by means of bolt and nut assemblies 45 to each of the projections 44 on either end thereof are oppositely inclined, longitudinally extending brake beam guides 46. Supported in the brake beam guides 46 are the opposite ends 48 of two longitudinally disposed, transversely extending brake beams 50. One of the brake beams 50 is operatively attached to one of the side frame members 10 through a dead brake lever 52 having its upper end pivotally attached to an adjusting quadrant 54 which in turn is secured to a lug 56 fastened, as already mentioned, to one of the side frame members 10 (see Fig. 5). The lower end of the dead brake lever 52 is pivotally attached by means of a connecting rod 58 to the lower end of a live brake lever 60. Both live and dead brake levers 52 and 60 extend through suitable holes 62 in brake beams 50 and are pivotally attached thereto as at 64. The upper end of live brake lever 60 may be secured to any conventional operating means such as an airbrake cylinder, etc.

With the construction just described it should be appreciated that brake beams 50 are solely supported and guided at the ends thereof by means of the guide pieces or members 46, the quadrant 54 only serving the purpose of adjusting the operating distances between the brake beams to compensate for wear, etc. (by pinning the upper end of lever 52 in an appropriate set of holes 65) of brake shoes 66 attached to the ends of the brake beams 50. The operation of this brake rigging is as follows: If it is desired to apply the brakes to the wheels 6 the upper end of the live brake lever 60 would be moved to the right as viewed in Fig. 1 by some suitable mechanism such as the aforementioned brake cylinder. Movement of the upper end of the brake lever 60 to the right causes lever 60 to initially pivot about the point 64. Pivotal movement of lever 60 about point 64 causes the rod 58 to move to the left as viewed in Fig. 1 and the upper end of lever 52 to pivot clockwise about its point of pivotal attachment to the quadrant 54. This pivotal movement of lever 52 will cause the brake shoes 66 to engage the wheels 6 at which time the lever 60 will discontinue pivoting about point 64 and start to pivot about the adjustable point of attachment of the lower end of lever 60 to the rod 58. The clockwise pivotal movement of lever 60 about the point to which it is attached to rod 58 will cause the right-hand brake beam 50 (as viewed in the drawing) to move to the right so that the brake shoes 66 attached thereto will engage the wheels 6 associated therewith and braking of all four wheels is achieved.

It is believed that the means for supporting the ends of the brake beams and the location of these means outside the side frame members and outside the wheels is unique. By providing this manner of support it will be observed that it is a relatively simple matter to remove the guides 46 and pivotal connections of the upper ends of the dead and live brake levers 52 and 60, respectively, so that the brake assembly can be dropped down and easily removed from the truck. This feature enables the brake rigging to be changed out as a complete assembly and consequently expedites the maintenance and repair thereof.

Figure 4:
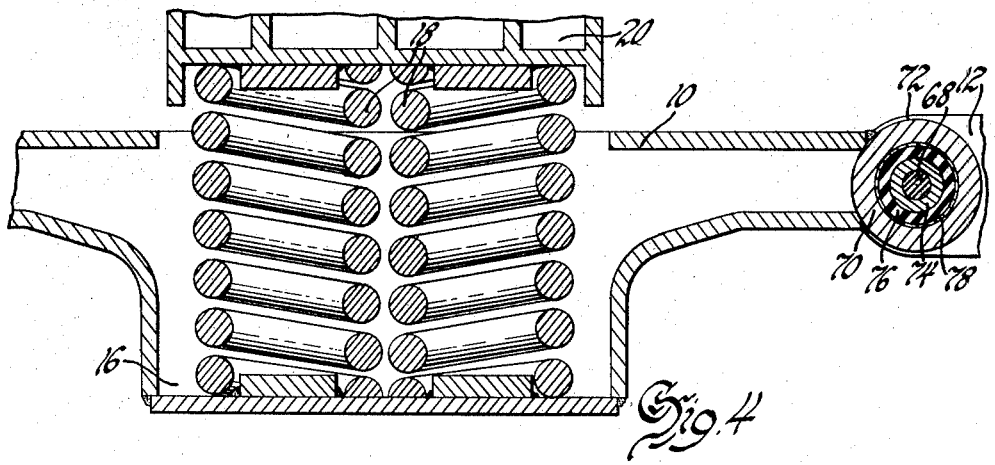
Fig. 4 is a sectional view in elevation taken on the line 4—4 of Fig. 1 further illustrating how the bolster is supported on the side frames and also details of one of the articulated joints acting between one side frame member and a projection on an axle member.

Referring now to Figs. 1 and 4 it will be observed that the side frame members 10 are connected to the projections 12 by means of pinned joints including double end-threaded pins or bolts 68 extending through bosses 70 on the ends of the side frame members 10 and bifurcations 72 on the ends of the projections 12. To insure a quiet-acting joint the pins or bolts 68 are surrounded by a metallic bushing 74 jacketed with bushing 76 made of some resilient material such as rubber. A third bushing 78 is bonded to the resilient bushing 76 so that the three bushings may be inserted in the bosses 70 as a unit. The entire assembly is securely retained in the bifurcations 72 by means of lock nuts 80 applied to pins 68.

With the pin type of connection it will be appreciated that there is a slight tendency on the part of the truck to collapse at these connections which is somewhat accentuated by the use of the aforementioned resilient bushings. The truck frame, however, is sustained by the fact that the pin joints offer resistance to horizontal turning between projections 12 and the side frames 10. Further resistance to turning of the latter members is also offered by the flanges of the wheels 6 engaging the usual rails. This slight tendency of the truck to collapse, which as should be appreciated would be about a line through the two pin joints and the center of the truck, is cushioned by the bushing 76 and it is this cushioning and slight collapsing that allows the truck frame to articulate under adverse or bumpy rail conditions and improves the ride of the truck. It is important to realize that this slight collapsing is obtained by spacing the pinned joints so that they are located inboard the axes of the axles of the truck. Further advantages in locating these pinned joints inside the axes of the axles of the truck are that it enables the truck to be built lower since it is unnecessary for the side frame members to extend over the axles and by using pinned joints a positive connection is obtained which holds the truck together when derailed or lifted. It is, of course, understood that the spacing of the pin joints between axes of the axles of the truck and the center of the truck may be varied so as to vary the amount of articulation between the rigid units which, as mentioned, include one of the axle members 2 and a side frame member 10.

A modification of the connection between projection 12 and an axle member 2 is shown in Fig. 7 and comprises a ball and socket joint 82. The ball and socket joint 82 is shown with the ball being attached to a side frame and the socket being attached to an axle member. It will be appreciated, however, that the ball and socket could be interchanged without affecting the operation of this joint. A somewhat different result is obtained with the ball and socket joint in that there are no forces acting between the side frame member and projection 12 tending to sustain the two units and prevent them from collapsing about the diagonal line through the two ball and socket joints and the center of the truck. In other words, the truck is sustained in the position shown solely by the forces acting between the flanges of the wheels and the rails and the slight conical configuration of the wheel face as it engages the rail. This more or less lateral engagement between rail and flanges of course tends to damp oscillations which might otherwise occur in these joints.

It should be appreciated that for certain applications in which it may be desirable to change the character of articulation it may be preferable to use vertically pinned joints rather than horizontally pinned joints. Such a modification has been shown in Fig. 8. Referring to that figure it will be observed that the pins 68 are vertical and extend through vertically spaced bifurcations on the projections 12 between which are interposed vertically extending bosses 83 attached to the ends of the side frame members 10.

It may be now appreciated that there has been provided an unusually rugged high speed truck whose unique articulated construction gives unusually superior riding characteristics at all speeds. The truck has positive connections between all elements at all times to hold it together in case of its derailment or lifting. It is, however, constructed so that the brake rigging and bolster may be very easily and quickly applied and removed for expeditious maintenance and repair.

I claim:

1. A 4-wheel railway truck frame comprising a pair of rigid assemblies each including a transversely extending axle housing member and a longitudinally extending side frame member connected together to form a corner of the truck frame with corners thus formed being diagonally located with respect to each other, each of said axle housing members having a projection rigidly connected thereto at one of the other set of diagonally located corners of said truck, said projections extending toward the transverse center line of said truck and an associated side frame member, and articulated joints located between the axes of said housing members and the transverse center line of said truck connecting each of said projections to the associated side frame member toward which it extends.

2. A 4-wheel railway truck frame comprising a pair of rigid assemblies each including a transversely extending axle housing member and a longitudinally extending side frame member connected together to form a corner of the truck frame with corners thus formed being diagonally located with respect to each other, each of said axle housing members having a projection rigidly connected thereto at one of the other set of diagonally located corners of said truck, said projections extending toward the transverse center line of said truck and an associated side frame member, and pinned joints located between the axes of said housing members and the transverse center line of said truck connecting each of said projections to the associated side frame member toward which it extends.

3. A 4-wheel railway truck frame comprising a pair of rigid assemblies each including a transversely extending axle housing member and a longitudinally extending side frame member connected together to form a corner of the truck frame with corners thus formed being diagonally located with respect to each other, each of said axle housing members having a projection rigidly connected thereto at one of the other set of diagonally located corners of said truck, said projections extending toward the transverse center line of said truck and an associated side frame member, and transversely pinned joints located between the axes of said housing members and the transverse center line of said truck connecting each of said projections to the associated side frame member toward which it extends.

4. A 4-wheel railway truck frame comprising a pair of rigid assemblies each including a transversely extending axle housing member and a longitudinally extending side frame member connected together to form a corner of the truck frame with corners thus formed being diagonally located with respect to each other, each of said axle housing members having a projection rigidly connected thereto at one of the other set of diagonally located corners of said truck, said projections extending toward the transverse center line of said truck and an associated side frame member, and vertically pinned joints located between the axes of said axle housing members and the transverse center line of said truck connecting each of said projections to the associated side frame member toward which it extends.

5. A 4-wheel railway truck frame comprising a pair of rigid assemblies each including a tranversely extending axle housing member and a longitudinally extending side frame member connected together to form a corner of the truck frame with corners thus formed being diagonally located with respect to each other, each of said axle housing members having a projection rigidly connected thereto at one of the other set of diagonally located corners of said truck, said projections extending toward the transverse center line of said truck and an associated side frame member, and ball and socket joints located between the axes of said axle housing members and the transverse center line of said truck connecting each of said projections to the associated side frame member toward which it extends.

6. A 4-wheel railway truck frame comprising a pair of rigid assemblies each including a transversely extending axle housing member and a longitudinally extending side frame member connected together to form a corner of the truck frame with corners thus formed being diagonally located with respect to each other, each of said axle housing members having a projection rigidly connected thereto at one of the other set of diagonally located corners of said truck, said projections extending toward the transverse center line of said truck and an associated side frame member, and pinned joints located between the axes of said axle housing members and the transverse center line of said truck connecting each of said projections to the associated side frame member toward which it extends, the pins of said joints being cushioned in resilient material.

7. A 4-wheel railway truck including a frame comprising a pair of rigid assemblies each including a transversely extending axle housing member and a longitudinally extending side frame member connected together to form a corner of the truck frame with corners thus formed being diagonally located with respect to each other, each of said axle housing members having a projection rigidly connected thereto at one of the other set of diagonally located corners of said truck, said projections extending toward the transverse center line of said truck and an associated side frame member, articulated joints located between the axes of said axle housing members and the transverse center line of said truck connecting each of said projections to the associated side frame member toward which it extends, and a truck bolster resiliently supported on said side frame members intermediate said joints.

References Cited in the file of this patent

UNITED STATES PATENTS

| 1,905,252 | Symington | Apr. 25, 1933 |
| 2,098,459 | McWhirter | Nov. 9, 1937 |
| 2,286,608 | Eksergian | June 16, 1942 |
| 2,300,975 | Sale | Nov. 3, 1942 |
| 2,558,150 | Orr et al. | June 26, 1951 |
| 2,620,742 | Watter | Dec. 9, 1952 |
| 2,710,676 | McCormick | June 14, 1955 |

FOREIGN PATENTS

| 722,414 | Germany | July 9, 1942 |